United States Patent
Lee et al.

(10) Patent No.: US 12,355,372 B2
(45) Date of Patent: Jul. 8, 2025

(54) ROTATIONAL TRIBOELECTRIC NANOGENERATOR FOR NEURO-STIMULATOR

(71) Applicant: DAEGU GYEONGBUK INSTITUTE OF SCIENCE AND TECHNOLOGY, Daegu (KR)

(72) Inventors: Sang Hoon Lee, Daegu (KR); Min Seok Kang, Seoul (KR); Hee Jae Shin, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 156 days.

(21) Appl. No.: 18/203,696

(22) Filed: May 31, 2023

(65) Prior Publication Data
US 2024/0039428 A1    Feb. 1, 2024

(30) Foreign Application Priority Data
Jul. 26, 2022  (KR) .................. 10-2022-0092298

(51) Int. Cl.
*H02N 1/04*    (2006.01)
(52) U.S. Cl.
CPC .................. *H02N 1/04* (2013.01)
(58) Field of Classification Search
CPC ....................................................... H02N 1/04
(Continued)

(56) References Cited

U.S. PATENT DOCUMENTS

| 2011/0050181 A1* | 3/2011 | Post ................... H02N 1/04 320/166 |
| 2014/0246951 A1* | 9/2014 | Wang ................ H02N 1/04 310/310 |

(Continued)

FOREIGN PATENT DOCUMENTS

| KR | 10-1611136 B1 | 4/2016 |
| KR | 10-1875271 B1 | 7/2018 |

(Continued)

OTHER PUBLICATIONS

LU 92828; Triboelectric Generator With Regeneration Of Active Surface (Year: 2017).*

(Continued)

*Primary Examiner* — Ahmed Elnakib
(74) *Attorney, Agent, or Firm* — Hauptman Ham, LLP

(57) ABSTRACT

The present invention relates to a neuro-stimulator, and more particularly, to a rotational triboelectric nanogenerator for a neuro-stimulator providing, as a device that may directly utilize nerve stimulation triboelectricity generated by rotational energy for nerve electrical stimulation, a device that may adjust waveforms and stimulation parameters of electricity generated during frictional contact through a combination of various materials with triboelectric properties and patterns of materials and electrodes, implement various nerve stimulation parameters by adjusting an external rotational speed or a distance between friction layers, does not require complicated circuits or voltages and batteries to drive the batteries, and may be driven through relatively small volume, inexpensive materials, a simple structure, and a simple operation method.

10 Claims, 13 Drawing Sheets

(58) Field of Classification Search
USPC .................................................. 310/309, 310
See application file for complete search history.

(56) References Cited

U.S. PATENT DOCUMENTS

| | | | |
|---|---|---|---|
| 2015/0097465 A1* | 4/2015 | Karagozler | H02N 1/08 310/300 |
| 2016/0149518 A1* | 5/2016 | Wang | F03B 13/14 310/310 |
| 2016/0218640 A1* | 7/2016 | Wang | H02N 1/04 |
| 2016/0365808 A1* | 12/2016 | Kim | H02N 1/04 |
| 2017/0117824 A1* | 4/2017 | Jiang | H02N 2/183 |
| 2017/0191466 A1* | 7/2017 | Perez | H02N 1/08 |
| 2017/0331396 A1* | 11/2017 | Byun | H02N 1/04 |
| 2017/0359001 A1* | 12/2017 | Wang | C23C 16/045 |
| 2018/0191274 A1* | 7/2018 | Arulandu | H02N 1/04 |
| 2022/0110555 A1* | 4/2022 | Gao | A61B 5/6832 |
| 2024/0039428 A1* | 2/2024 | Lee | H02N 1/04 |

FOREIGN PATENT DOCUMENTS

| | | |
|---|---|---|
| KR | 10-2150725 B1 | 9/2020 |
| KR | 10-2021-0016133 A | 2/2021 |
| KR | 10-2210498 B1 | 2/2021 |
| KR | 10-2021-0073212 A | 6/2021 |
| KR | 10-2370774 B1 | 3/2022 |

OTHER PUBLICATIONS

Office Action dated Jul. 17, 2024 for corresponding Korean Patent Application No. 10-2022-0092298, along with an English translation (11 pages).

Ryu et al., "Self-rechargeable cardiac pacemaker system with triboelectric nanogenerators," Nature Communications, Jul. 16, 2021, vol. 12, 4374 (9 pages).

* cited by examiner

FIG. 3C

| Frequency [Hz] | Mo electrode based RoTENG [nC] | Au electrode based RoTENG [nC] |
|---|---|---|
| 10 | 103.23 | 121.42 |
| 20 | 101.76 | 122.83 |
| 30 | 103.10 | 123.57 |
| 40 | 102.47 | 124.20 |
| 50 | 100.89 | 124.56 |

ROTATIONAL TRIBOELECTRIC NANOGENERATOR FOR NEURO-STIMULATOR

CROSS-REFERENCE TO RELATED APPLICATIONS

This application claims priority under 35 U.S.C. § 119 to Korean Patent Application No. 10-2022-0092298, filed on Jul. 26, 2022, in the Korean Intellectual Property Office, the disclosure of which is incorporated herein by reference in its entirety.

TECHNICAL FIELD

The following disclosure relates to a rotational triboelectric nanogenerator for a neuro-stimulator capable of activating or inhibiting nerve activity by stimulating nerves using electricity generated by triboelectricity.

BACKGROUND

A neuro-stimulator activates or inhibits nerve activities such as central nerves (brain, spinal cord) or peripheral nerves through voltage or current stimulation, and is used for purposes such as biomechanism research, disease treatment, and rehabilitation. For example, the neuro-stimulator may be used to treat neurological disorders such as depression or Parkinson's disease by stimulating a brain, or regulate body's functions or treat chronic diseases through peripheral autonomic nerve stimulation, and may be used to treat chronic pain or abnormal sensations by inhibiting nerve signals through high-frequency nerve stimulation.

The conventional neuro-stimulator generally includes nerve electrodes, pulse generating stimulators, and stimulation programs adjusting stimulation parameters. Since the stimulator is implemented in the form of implantation in the human body, the stimulator is based on a battery voltage, is based on voltage stimulation, and requires complicated circuits to implement stimulation parameters. In addition, in order to transform the stimulations differently, it is possible to artificially change programs according to results of nerve stimulation efficacy based on the programmed stimulation parameters, and a circuit-based voltage waveform is mainly generated in the form of a square pulse wave.

However, the conventional voltage-based neuro-stimulator has a problem in that the amount of charge transfer, which is an important factor in nerve stimulation, changes when electrical resistance characteristics of nerve tissue change by nerve electrodes. In addition, the electrical resistance characteristics through the nerve electrodes may vary depending on various conditions such as an electrode material, a design, an insertion location, and a degree of contact with nerve tissue inside the body, and when scar tissue is formed due to an immune response, resistance increases dramatically. Therefore, in order to see the same efficacy through the nerve stimulation, since it is necessary to continuously change nerve stimulation parameters in response to various conditions, and it is necessary to change parameters such as stimulation intensity and frequency of nerve tissue according to the treatment efficacy and purpose, it is desirable to be able to adjust stimulation parameters such as frequency, amplitude, and pulse width. However, the conventional neuro-stimulator has limitations in adjusting parameters other than programmed stimulation options, a square pulse wave, which is a pulse waveform generated based on a voltage, is not an effective waveform for nerve stimulation, and the conventional neuro-stimulator has limitations in implementing various pulse waveforms.

Unlike these voltage-based neuro-stimulator, the conventional current-based neuro-stimulator capable of constant charge transfer regardless of changes in electrical resistance characteristics of nerves and nerve electrodes requires a structure for shielding external electricity and magnetic field and a complex internal circuit configuration to generate a current suitable for stimulating nerve tissue, so the huge volume is formed, and the considerable weight and high price are formed. In addition, the conventional current and voltage-based neuro-stimulators usually have batteries because they require a continuous and stable external power source, and these batteries should be replaced after 5 to 7 years at the longest due to the limit of usage. However, since the battery can be inserted and replaced only through additional surgery for the neuro-stimulator inserted into the human body, there is a risk that the surgery may impose a burden on patients economically and psychologically and may cause physical problems.

In addition, in order to overcome this problem, research on nerve stimulation through battery charging or wireless energy transfer through wireless communication is being actively conducted, but there are limitations in implementing various stimulation parameters and it is difficult to implement current stimulation.

SUMMARY

An embodiment of the present invention is directed to providing a neuro-stimulator capable of being directly used for nerve electrical stimulation by generating triboelectricity for nerve stimulation from rotational motion of a body using triboelectrification, without the need for complicated circuits and a voltage and batteries for driving the complicated circuits, and a rotational triboelectric nanogenerator for a neuro-stimulator capable of implementing triboelectricity of various stimulation parameters by continuously changing nerve stimulation parameters variously according to characteristics of nerve tissue.

In one general aspect, a rotational triboelectric nanogenerator for a neuro-stimulator includes: a disk-shaped electrode unit; a first charging body stacked on an upper surface of the electrode unit; and a second charging body having a charge opposite to that of the first charging body and disposed on an upper surface of the first charging body, in which the second charging body is configured to be disposed concentrically with the electrode unit and the first charging body, and rotatable with respect to at least one or more of the electrode unit and the first charging body.

The second charging body may be formed to have a smaller area than the first charging body to form a predetermined pattern.

The second charging body may be formed so that an edge portion is formed to be in contact with the first charging body with a widest area and contact with a gradually narrower area toward the center.

The electrode unit may include at least a first electrode and a second electrode, and the electrode unit may be divided into a plurality of compartments, and different electrodes may be alternately disposed adjacent to each other at predetermined intervals in a region formed by the compartments.

The second charging body may be formed in a predetermined pattern corresponding to an arrangement of the first electrode or an arrangement of the second electrode.

The rotational triboelectric nanogenerator for a neuro-stimulator may adjust a stimulation signal by adjusting the number of patterns of the first electrode and the second electrode in the electrode unit.

The rotational triboelectric nanogenerator for a neuro-stimulator may adjust a stimulation signal by adjusting a rotational speed of the second charging body.

The rotational triboelectric nanogenerator for a neuro-stimulator may adjust a stimulation amplitude by adjusting a distance between the second charging body and the first charging body.

The first charging body may further include an auxiliary first charging body formed in a predetermined area on the first charging body, and the first charging body and the auxiliary first charging body may be made of different materials.

The first charging body and the auxiliary first charging body may be composed of at least one each and may be alternately disposed to each other, and the area of the first charging body and the area of the auxiliary first charging body may be formed to be different from each other.

BRIEF DESCRIPTION OF THE DRAWINGS

FIG. 3C is a chart of a change in frequency according to the change in the number of electrode patterns at a constant rotational speed.

DETAILED DESCRIPTION OF MAIN ELEMENTS

Figure 1:
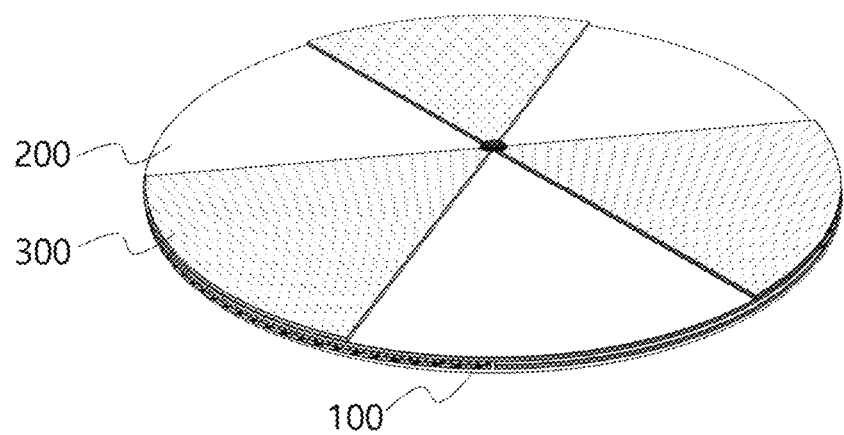
FIG. 1 is an overall perspective view of a rotational triboelectric nanogenerator for a neuro-stimulator according to an embodiment.

100: Electrode unit
110: First electrode
120: Second electrode
200: First charging body
210: Auxiliary first charging body
300: Second charging body

DETAILED DESCRIPTION OF EMBODIMENTS

Hereinafter, the technical spirit of the present invention will be described in more detail with reference to the accompanying drawings. Terms and words used in the present specification and claims are not to be construed as a general or dictionary meaning, but are to be construed as meaning and concepts meeting the technical ideas of the present invention based on a principle that the present inventors may appropriately define the concepts of terms in order to describe their inventions in best mode.

Therefore, configurations described in exemplary embodiments and the accompanying drawings of the present invention do not represent all of the technical spirits of the present invention, but are merely most preferable embodiments. Therefore, the present invention should be construed as including all the changes, and substitutions included in the spirit and scope of the present invention at the time of filing this application.

Hereinafter, the technical spirit of the present invention will be described in more detail with reference to the accompanying drawings. However, the accompanying drawings are only examples shown in order to describe the technical idea of the present invention in more detail. Therefore, the technical idea of the present invention is not limited to shapes of the accompanying drawings.

The present invention relates to a rotational triboelectric nanogenerator for a neuro-stimulator, and a neuro-stimulator that may generate triboelectricity by rotational energy and may directly utilize the generated triboelectricity for nerve electrical stimulation. In this case, it is preferable that the neuro-stimulator of the present invention operates by being inserted into the body at a position of a nerve to be stimulated. In particular, since the present invention is configured such that triboelectrification is generated by rotational motion, a triboelectric generator that generates triboelectrification is coupled to body parts that perform rotational motion, such as knees and elbows, or wearable devices such as exoskeleton or upper and lower extremity prostheses. Accordingly, the neuro-stimulator is configured to generate the triboelectrification from the rotational motion to generate triboelectricity, and stimulate nerves using the generated triboelectricity. Therefore, unlike the related art, since electricity is generated using triboelectrification, a separate battery is not required, so the volume of the device itself inserted into the body may be reduced, the weight is lighter, and since additional surgery due to conventional battery replacement is not required, the psychological, economic and physical burden of a patient may be reduced. In addition, nerve stimulation performed by converting a mechanical motion into an immediate electrical stimulation signal may be more suitably used for complex types of application technologies such as gait control, rehabilitation treatment, and sensory feedback.

Figure 2:
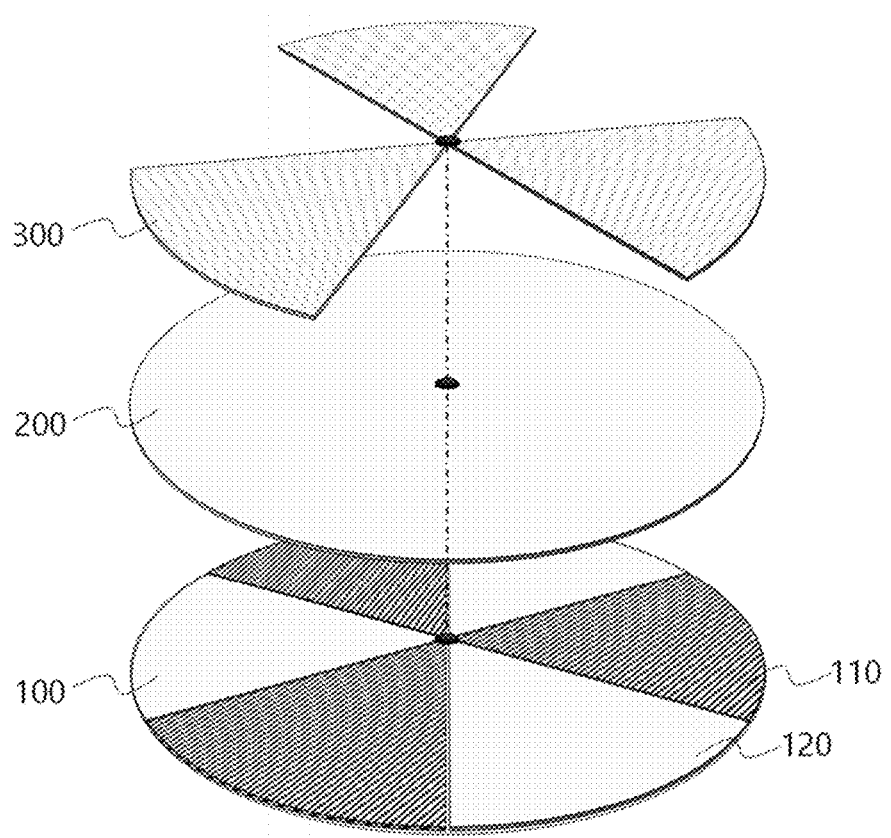
FIG. 2 is an exploded perspective view of the rotational triboelectric nanogenerator for a neuro-stimulator according to the embodiment.

Referring to FIGS. 1 and 2, the rotational triboelectric nanogenerator for a neuro-stimulator of the present invention includes a disk-shaped electrode unit 100, a first charging body 200 that is stacked on an upper surface of the electrode unit 100, and a second charging body 300 that has a charge opposite to that of the first charging body 200 and is disposed on an upper surface of the first charging body 200, and the second charging body 300 is configured to be disposed concentrically with the electrode unit 100 and the first charging body 200 and mutually rotate with respect to at least one or more of the electrode unit 100 and the first charging body 200.

The present invention is characterized in that the triboelectric generator generating the triboelectricity is configured in a rotational driving method among sliding driving methods. Therefore, the present invention is characterized in that the electrode unit 100, the first charging body 200, and the second charging body 300 are all disposed to have concentric circles, and the second charging body 300 is rotatably configured with respect to at least one of the electrode unit 100 and the first charging body 200.

In more detail, the electrode unit 100 is provided to be used as an electrode for generating an electrical signal, and is formed in a disk shape and arranged on the lower surface. The electrode unit 100 may include at least one electrode and may include a plurality of electrodes made of different materials. In addition, the electrode unit 100 may be arranged while the electrode has a predetermined pattern and a disk shape. It is preferable that the electrode is made of a biocompatible and biodegradable metal so that it may be inserted into the body and used while being robust to perform the role of the electrode. The electrode may be made of a material such as a conductive metal or a conductive polymer, but in an embodiment of the present invention, the electrode is preferably a metal of molybdenum (Mo).

As an embodiment of the present invention, referring to FIGS. 1 and 2, the electrode unit 100 includes a first electrode 110 and a second electrode. In this case, the first electrode 110 and the second electrode 120 are electrodes of the same material composed of each Mo metal, but are arranged in separate regions. In more detail, the electrode unit 100 may have a pattern in which zones are radially divided into a plurality of compartments in the disk shape, and the first electrode 110 and the second electrode 120 may be separated from each other and arranged in each zone. As an example of the present invention, the first electrode 110 and the second electrode are alternately arranged adjacent to each other in sequence. In addition, in order to generate a current due to the sliding method, the first electrode 110 and the second electrode may be spaced apart from each other at a predetermined interval on the electrode unit 100. The present invention is characterized in that parameters of triboelectricity generated by adjusting the patterning shape of the first electrode 110 and the second electrode on the electrode unit 100 or adjusting the areas of the first electrode 110 and the second electrode, respectively, may be adjusted. The electrode unit 100 of the present invention may include a plurality of electrodes as needed, the electrodes may be made of different materials, and the electrodes may be arranged in various patterns within the disk shape of the electrode unit 100.

Figure 3A:
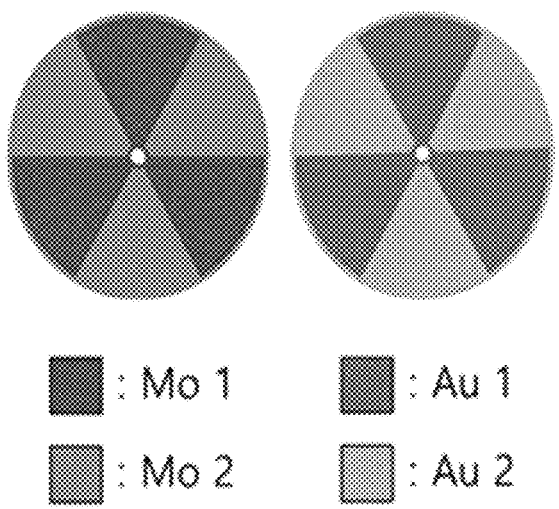
FIG. 3A is a configuration diagram of the rotational triboelectric nanogenerator for a neuro-stimulator according to the embodiment.
Figure 3B:
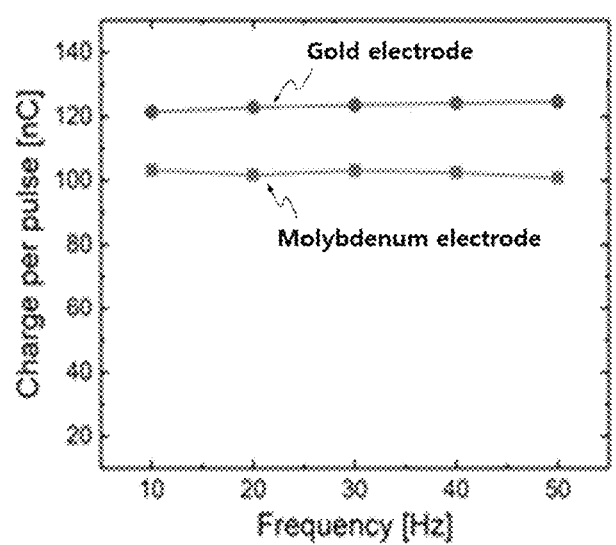
FIG. 3B is a graph of a change in frequency according to the change in the number of electrode patterns at a constant rotational speed.

The electrode unit 100 of the present invention adjusts a type of electrodes provided, a shape of patterns to be arranged, and the number of each of the plurality of electrodes, and the like, and adjusts a stimulation signal to be implemented by the neuro-stimulator of the present invention. That is, when the number of the plurality of electrodes provided in the electrode unit 100 increases as illustrated in FIGS. 3A, 3B and 3C, a stimulation signal with a high frequency compared to the same rotational speed may be generated. Using this, it is possible to generate a high frequency in the 1 to 10 kHz region by increasing the number of electrodes provided, and since nerve stimulation from high-frequency stimulation is effective in suppressing nerves, it may be applied to nerve block technology such as chronic pain.

The first charging body 200 is provided to serve as a substrate, formed in a form corresponding to the electrode unit 100, and stacked above the electrode unit 100, and the first charging body 200 is preferably selected from a material having good triboelectric properties. When the first charging body 200 is stacked on the electrode unit 100, it may be deposited so as to be coupled to the electrode unit 100 by face-to-face contact, and thus, the electrode unit 100 and the first charging body 200 may be composed of a stator layer in the electrode stimulator of the present invention. In this case, the first charging body 200 is formed in a form corresponding to the electrode unit 100, but formed larger than the area of the electrode unit 100, so the electrode unit 100, which includes the plurality of electrode units 100, may be arranged to be more stably coupled to the first charging body 200. That is, the first charging body 200 is formed in a disk shape, and a plurality of electrodes are arranged along a certain pattern on the lower surface of the second charging body 300 and coupled to form the electrode unit 100. The first charging body 200 may be made of a flexible material or a hard material. It is preferable that the difference in electronegativity from the second charging body 300 is large so that an electrical signal may be effectively generated due to contact with the second charging body 300.

Figure 4:
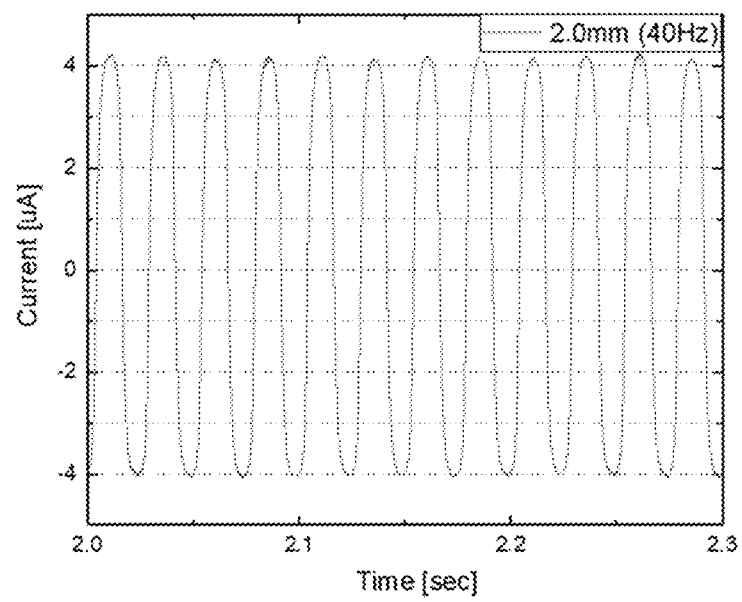
FIG. 4 is a graph of measurement results of a sine-shaped waveform generated by actual rotation of a neuro-stimulator according to an embodiment of the present invention.

As an embodiment of the present invention, referring to FIGS. 1 and 2, the first charging body 200 is made of an excellent material (polytetrafluoroethylene (PTFE)) that is biocompatible and has excellent triboelectric properties. In addition, when the electrode unit 100 has a disk shape, the first charging body 200 may be formed in a disk shape corresponding to the electrode unit 100. Accordingly, the neuro-stimulator of the present invention may generate a charge-balanced biphasic current pulse, which is a pulse capable of long-term stimulation by reducing nerve damage caused by electrical stimulation. In addition, FIG. 4 is an example of a sine wave signal generated by the actual rotation of the present invention formed in a circular shape, and with reference to this, in the present invention, a pulse form may be implemented in a Gaussian form, an exponential form, a sinusoidal form, or the like, which has the effect of stimulating nerves more efficiently than a general square pulse.

Figure 5:
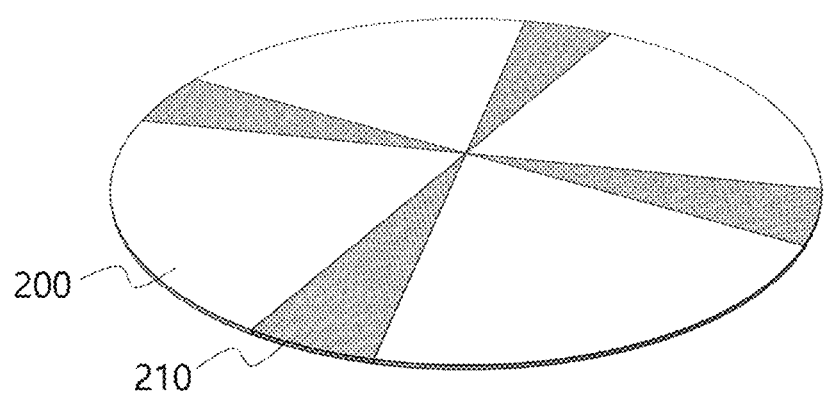
FIG. 5 is a perspective view of a patterned first charging body according to an embodiment of the present invention.
Figure 6:
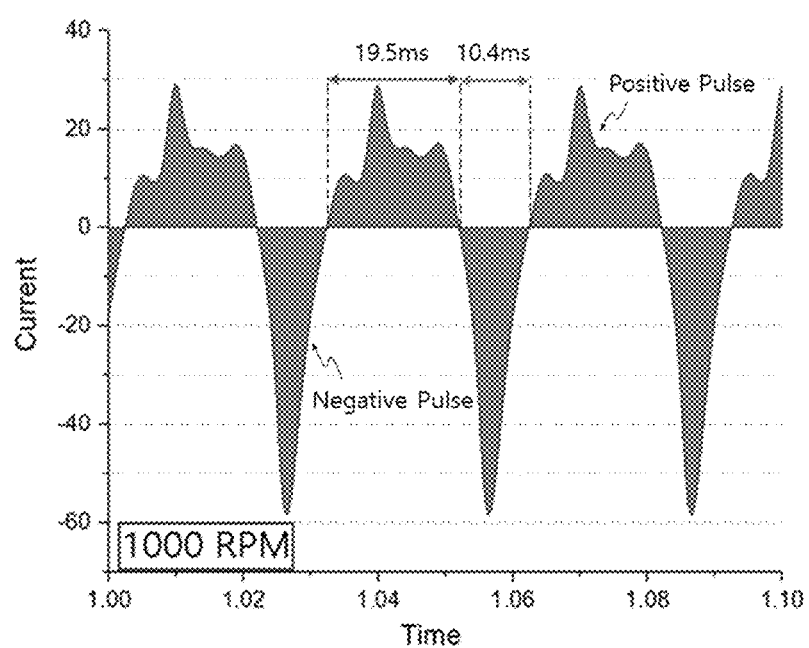
FIG. 6 is a graph of measurement results of an asymmetric charge-balanced biphasic current pulse according to a change in shape of a stimulus waveform generated through patterning of the first charging body of FIG. 5.

However, in another embodiment of the present invention, the first charging body 200 may form a predetermined pattern in order to change the stimulation parameter. Accordingly, the first charging body 200 of the present invention may include an auxiliary first charging body 210, and the first charging body 200 and the auxiliary first charging body 210 are freely arranged according to a stimulation parameter to be generated, so a predetermined pattern may be formed and various stimulation parameters may be implemented. For example, as illustrated in FIG. 5, the first charging body 200 and the auxiliary first charging body 210 may be disposed on the same surface, and the auxiliary first charging body 210 may have a smaller area than the first charging body 200, and the auxiliary first charging body 210 and the first charging body 200 may be alternately disposed. FIG. 6 is a diagram of measurement results of asymmetric charge-balanced biphasic current pulse generated from the rotation of the first charging body 200 formed in the pattern of FIG. 5, and the neuro-stimulator of the present invention has an effect of realizing the asymmetric charge-balanced biphasic current pulse by patterning the first charging body 200. In this case, since only pulses of one polarity (mainly cathode) are involved in stimulation, and pulses of other polarities are involved only to rule out electrical damage to nerves, the asymmetric charge-balanced biphasic current pulse is the most ideal type of electrical stimulation pulse in nerve stimulation.

Figure 7:
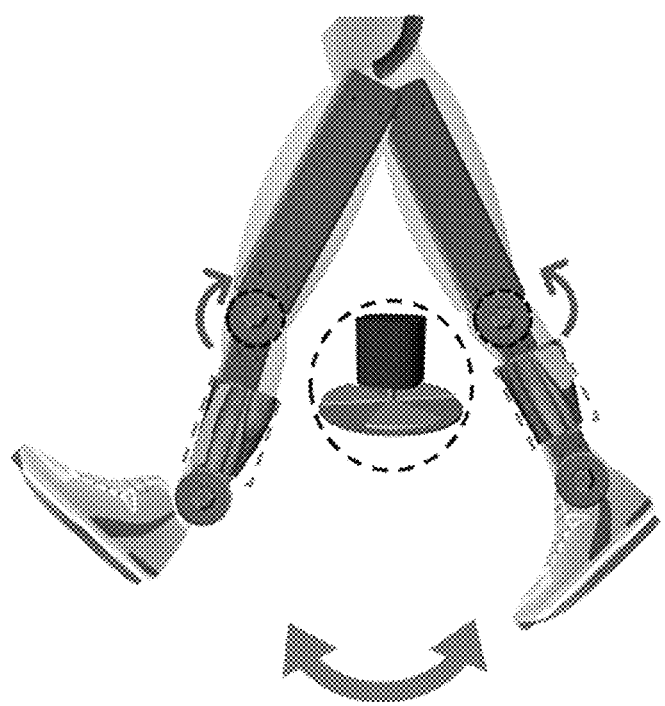
FIG. 7 is an application example of the neuro-stimulator of the present invention.

Referring to FIGS. 1 and 2, the second charging body 300 is disposed above the first charging body 200, and is preferably made of a material having an opposite charge to that of the first charging body 200. In addition, the second charging body 300 is disposed concentrically with the first charging body 200 and the electrode part 100, and at least one or more of the first charging body 200 and the electrode part 100 is configured to be rotatable. The second charging body 300 is provided to generate triboelectricity by moving on the area of the first charging body 200 and the electrode unit 100, and is preferably formed to have a smaller area than the first charging body 200 and the electrode part 100. As the second charging body 300 rotatably provided rotates on the first charging body 200, charges move by triboelectrification, which is an electrical signal generated from a change in a contact area between the second charging body 300 and the electrode unit 100, to generate power. For example, the first charging body 200 and the electrode unit 100 are formed in a stacked and fixed form and have a central axis at the center, and the second charging body 300 forms a concentric axis at the central axis and may be configured to be rotatably inserted, and may rotate to generate triboelectrification. In addition, as an embodiment of the present invention, the second charging body 300 forms a predetermined pattern and is rotatably coupled to the upper surface of the first charging body 200. By the predetermined pattern in which the second charging body 300 is formed and the patterning of the electrode unit 100, the neuro-stimulator of the present invention may change the shape of the stimulation waveform to be generated, thereby changing the target nerve or stimulation efficacy. In addition, since the stimulation signal is generated by utilizing mechanical rotational force through the rotation drive method, as illustrated in FIG. 7, it may be used in various wearable forms by coupling with auxiliary devices such as robot legs or an exoskeleton suit.

The second charging body 300 may be used as an electrode for generating an electrical signal with the electrode unit 100, and may be made of a flexible material without any limitation. Depending on the first charging body 200 or the electrode unit 100, the second charging body 300 may be made of a material that greatly contrasts with the second charging body 300 in terms of the difference in electronegativity. In one embodiment of the present invention, the first charging body 200 is made of PTFE. Accordingly, the second charging body 300 may be biocompatible and made of ethyl cellulose (EC) or aluminum (Al), which has excellent triboelectric properties of opposite polarity to that of the first charging body 200. Therefore, it is preferable to improve the output of the electrical signal by increasing the difference in electronegativity from the electrode unit 100 with which the second charging body 300 is in contact.

As the characteristics of the present invention, the second charging body 300 is preferably formed in a form corresponding to at least one of the electrode unit 100 and the first charging body 200, and more specifically, may be formed in a predetermined pattern corresponding to the arrangement of the first electrode 110 or the arrangement of the second electrode in the electrode unit 100. Referring to FIGS. 1 and 2, in one embodiment of the present invention, the electrode unit 100 is formed in a disk shape, zones are divided by a plurality of compartments, and the first electrode 110 and the second electrode may be alternatively arranged in each zone. In this case, the electrode unit 100 may be in the form of radially dividing the compartment with respect to the disk shape. Accordingly, the second charging body 300 may be formed so that an edge portion is formed to be in contact with the first charging body 200 with a widest area and contact with a gradually narrower area toward the center. That is, one piece of the second charging body 300 may be formed in a fan shape, or composed of a plurality of fan-shaped pieces, and each piece may be spaced apart from each other at a predetermined interval. Therefore, the second charging body 300 may be formed to correspond to the pattern in which the first electrode 110 is arranged or to correspond to the pattern in which the second electrode is arranged. Since the second charging body 300 is implemented in a rotating manner, it is possible to simply generate a stimulation signal having a higher frequency than other methods. In particular, it is possible to more easily generate a high frequency of 1 kHz or more required for nerve suppression.

Figure 8:
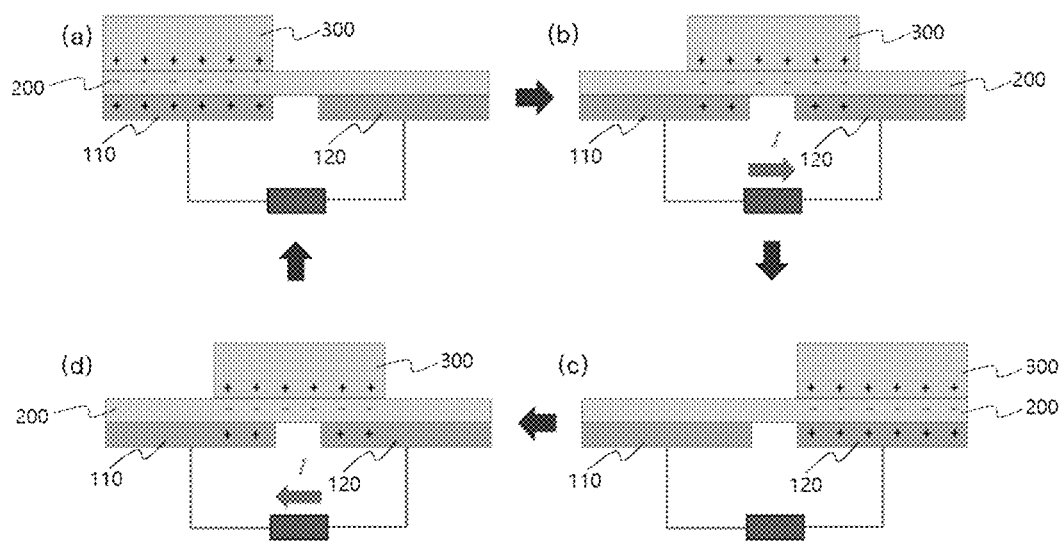
FIG. 8 is a flowchart of a stimulation signal generation mechanism of the neuro-stimulator of the present invention.

In the neuro-stimulator including the electrode unit 100, the second charging body 300, and the second charging body 300 having the above characteristics, the triboelectricity generation process will be described as an example. The electrical stimulator of the present invention is characterized in that the electrode unit 100 is made of Mo metal, the first charging body 200 is made of PTFE, and the second charging body 300 is made of Al. Accordingly, when the first charging body 200 and the second charging body 300 come into contact, they are positively and negatively charged, respectively, and driven in a freestanding triboelectric-layer mode and generate a stimulation signal. Referring to FIG. 8 in more detail, as illustrated in FIG. (a) of 8, when the second charging body 300 is on the first electrode 110 of different electrodes, charges are charged by triboelectrication and electrostatic induction with the first charging body 200. Then, as illustrated in FIG. (b) of 8, while the charging body 300 moves, the charged charges also move together, so the positive charge induced in the first electrode 110 by the negative charge charged in the first charging body 200 moves to the second electrode through an electric wire to generate a current. In addition, when the second charging body 300 moves and completely overlaps the second electrode as illustrated in FIG. (c) of 8, a current becomes 0, and as illustrated in FIG. (D) of 8, when the second charging body 300 moves from the second electrode to the second electrode again by additional rotation, a current flows in the opposite direction to FIG. (b) of 8. As illustrated in FIG. 4, in this way, a sine wave signal generated by actual rotation is generated. That is, the electrical stimulator of the present invention has an effect that the charge transfer efficiency is almost 100% from a simple structure in which electric wires are connected only to the electrode unit 100 and the first charging body 200 composed of the stator layer by the freestanding triboelectric-layer mode, and thus, the second charging body 300 of the rotator coupled to the stator layer freely rotates.

The rotational triboelectric nanogenerator for a neuro-stimulator of the present invention is characterized in that the stimulation parameters such as electric waveforms and stimulation pulse frequencies may be more easily adjusted.

To explain this in detail, first, the neuro-stimulator of the present invention is characterized in that t the frequency of stimulation generated by adjusting the patterns of electrodes of the electrode unit 100 and the number of respective electrodes may be adjusted. In this case, the reason why the neuro-stimulator of the present invention selected the rotation driving method among the sliding driving methods is that stimulation signals having a higher frequency may be easily generated. In addition, the electrode unit 100 has a plurality of electrodes, and as the number of respective electrodes increases as illustrated in FIGS. 3A, 3B and 3C, a higher frequency stimulation signal may be generated at the same rotational speed. That is, as the number of first electrodes 110 and second electrodes increases, a higher frequency may be generated. Since such high-frequency stimulation is effective for nerve suppression, there is an effect that may be used by applying to nerve blocking techniques such as chronic pain. Therefore, the frequency may be adjusted by adjusting the type of electrodes of the electrode unit 100 and the number of respective electrodes, so that various stimulation parameters may be implemented.

Figure 9A:
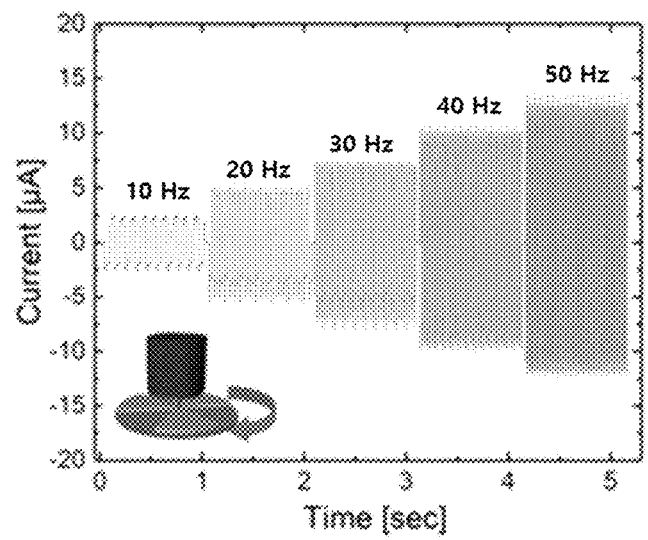
FIG. 9A is a graph of a change in stimulation frequency according to a rotational speed.
Figure 9B:
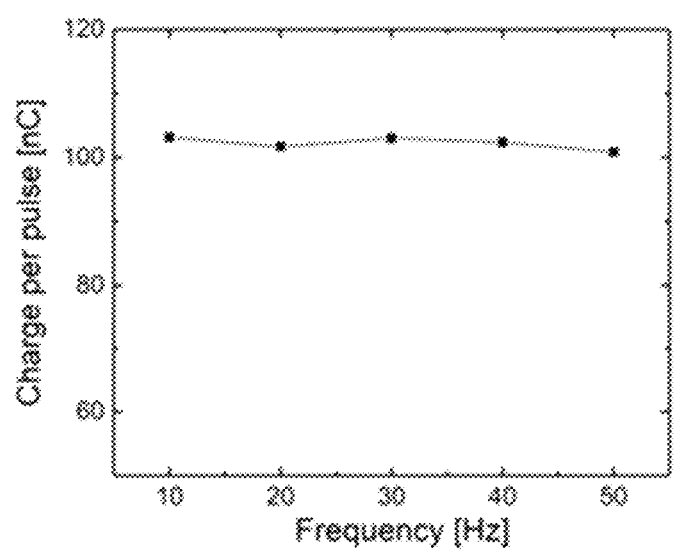
FIG. 9B is a graph of the amount of charge per pulse that is transmitted equally, but the frequency and current amplitude are different.
Figure 9C:
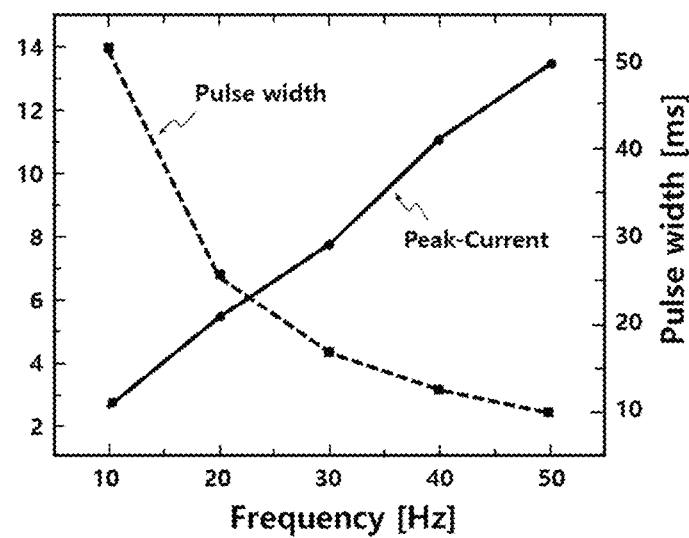
FIG. 9C is a graph of changes in current amplitude and pulse width according to frequency.

In addition, as illustrated in FIGS. 9A, 9B and 9C, the neuro-stimulator of the present invention is characterized in that the frequency of stimulation pulses generated by adjusting the rotational speed of the second charging body 300 may be finely adjusted. In this case, the amount of charge transferred per generated pulse is constant due to the characteristics of the triboelectric device's operating mechanism. Therefore, as illustrated in FIG. 9C, the change in frequency according to the rotational speed may implement a change in pulse width, and thus, it is possible to adjust the nerve stimulation parameters by applying the pulse of the constant amount of charge simultaneously with the change in frequency and the change in pulse width. The change in pulse width may be applied to a stimulation technique in which the felt sensation moves through a finger by adjusting the pulse width according to time in order to realize sensory feedback close to the actual sensation to the biolimb.

Figure 10A:
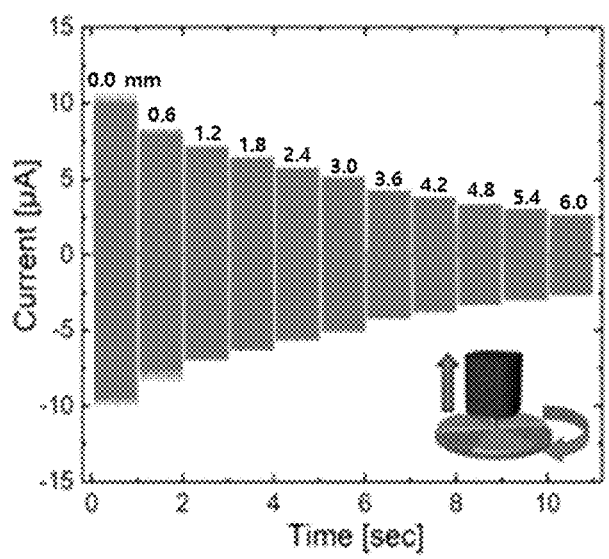
FIG. 10A is a graph of a change in current amplitude generated according to a distance between triboelectric layers.
Figure 10B:
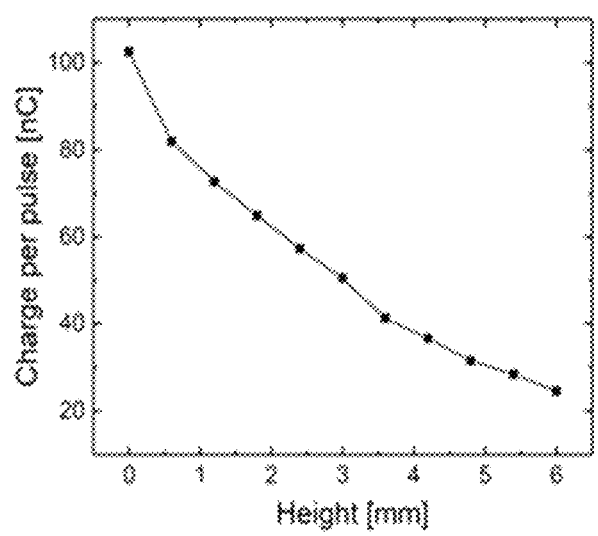
FIG. 10B is a graph of a change in the amount of charge per pulse.

In addition, as illustrated in FIGS. 10A and 10B, the neuro-stimulator of the present invention is characterized in that the amount of charge generated may be adjusted by adjusting the distance between the first charging body 200 and the second charging body 300. This means that the stimulation parameter may be adjusted only by adjusting the distance between the external rotational energy and the energy source. That is, according to the present invention, stable nerve stimulation may be realized through the asymmetrical charge-balanced biphasic form and customized in various signal forms such as Gaussian, sine, and exponential forms for more efficient stimulation, and various stimulation parameters may be implemented by adjusting the frequency, the pulse width, and the amount of charge, so stimulation or inhibition may be implemented for various nerves, thereby show various effects and functions.

Since the neuro-stimulator of the present invention generates the stimulation pulses based on the triboelectric nanogenerator, it does not require a separate battery and has a simpler circuit configuration. In addition, it is possible to generate an electrode by receiving a rotational motion from the rotational motion using motions of muscles or organs in a living body, and has an effect of directly and immediately providing the generated electrical energy to the body to stimulate the body. In addition, the Gaussian, sine, and exponential stimulation pulses may be simply generated, the asymmetric charge-balanced biphasic pulse may be easily generated by adjusting and recombining patterns or material combinations, and the stimulation parameters may be easily and freely adjusted, so there is an effect of providing a device that is smaller in size, inexpensive, and very effective for nerve stimulation compared to the related art.

Figure 11:
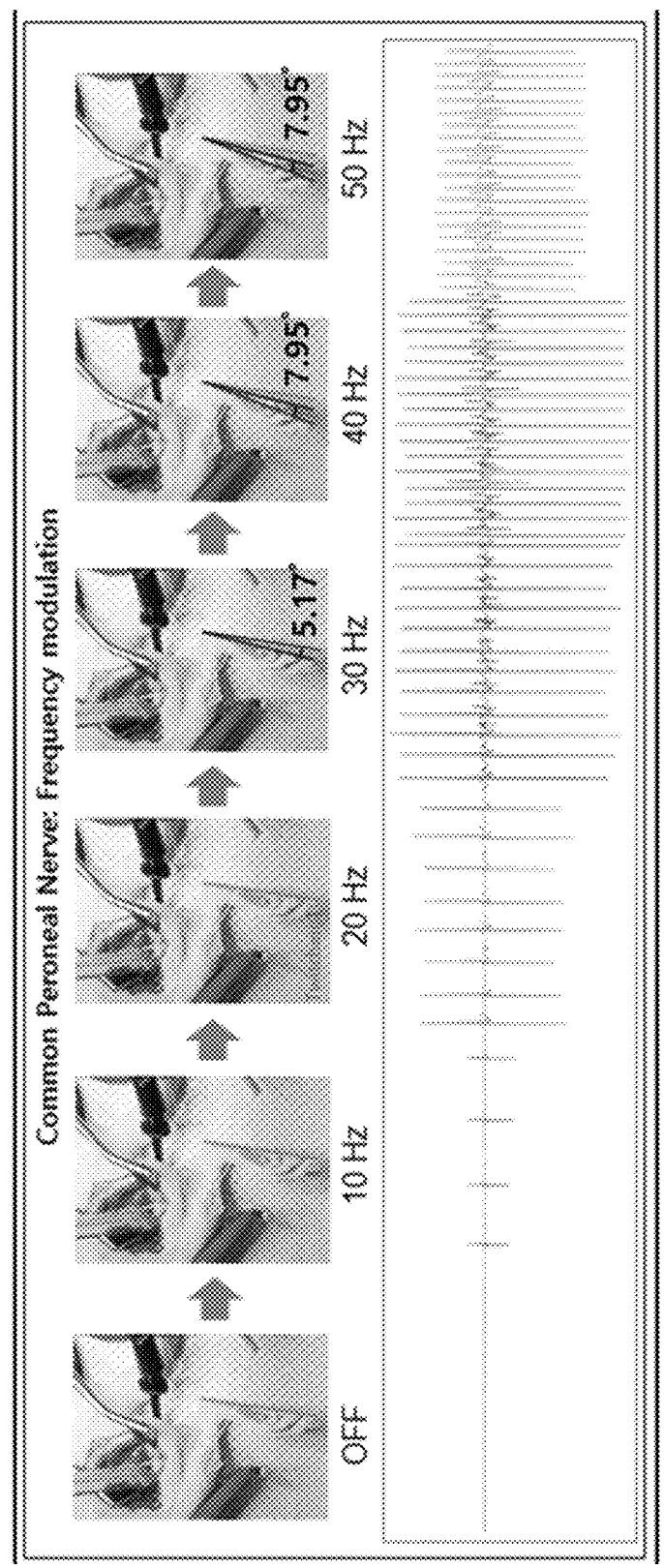
FIG. 11 is a rat leg muscle activation (EMG) signal according to nerve stimulation experiments in a common peroneal nerve according to rotation and a degree of contracted ankle angle according to frequency.
Figure 12:
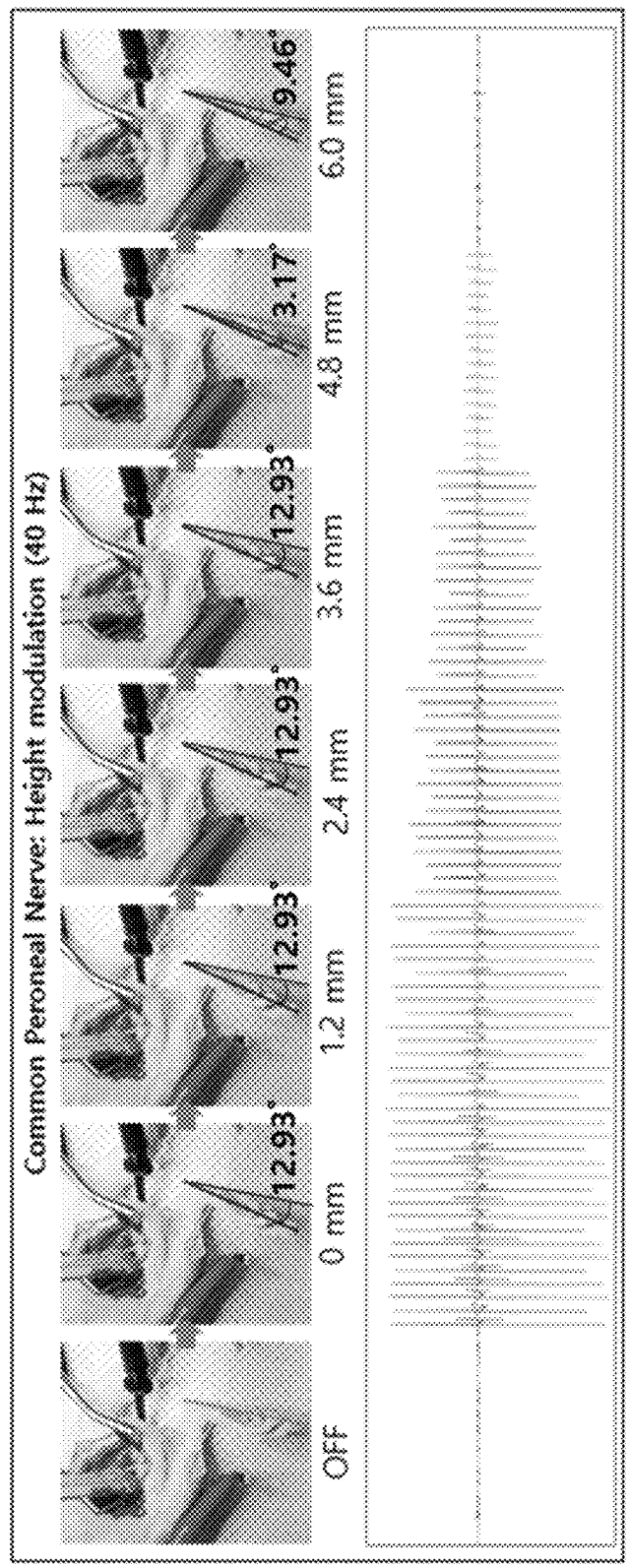
FIG. 12 is a diagram illustrating a degree of leg muscle signal (muscle relaxation) stimulated by a modulation of the amount of charge according to the distance between the triboelectric layers.

FIGS. 11 and 12 are pictures and graphs for success in modulating gastrocnemius (GA) muscle, which controls dorsiflexion in a plantar direction, and a tibialis anterior (TA) muscle, which controls dorsiflexion in an opposite direction to the gastrocnemius muscle, respectively, by stimulating common peroneal (CP) nerve and Tibial nerve, respectively, of a rat using the neuro-stimulator actually manufactured according to the present invention, As illustrated in FIG. 11, it was found that, in the low-frequency stimulation signal, short-term muscle contraction for each muscle may be induced to induce hind limb bobbing, and in high-frequency (30 to 50 Hz) stimulation signal, continuous muscle contraction may cause a change in ankle angle. In addition, as illustrated in FIG. 12, it can be observed that muscles naturally relax due to the gradual decrease in the amount of charge according to the increase in the distance between the stator (electrode unit 100 and the first charging body 200) and the rotator (the second charging body 300), and thus, the ankle angle gradually changed. As a result, it can be seen that the frequency may be easily adjusted in the neuro-stimulator of the present invention, and the amount of charge is adjusted by adjusting the distance between the stator (electrode unit 100 and the first charging body 200) and the rotator (the second charging body 300) to naturally adjust legs. Accordingly, the present invention has the effect of enabling patients who need treatment that requires periodic nerve stimulation or patients who need rehabilitation treatment using body tissue stimulation to easily generate and use electrical stimulation by themselves at a lower price without the help of others. In addition, since it is performed based on rotation, by coupling to wearable devices such as exo skeletons or lower limb prostheses to convert mechanical motions of the wearable devices into immediate electrical stimulation signals, it is expected that it may be used as a more complex type of application technology such as gait control through nerve stimulation, rehabilitation treatment, and sensory feedback.

The neuro-stimulator of the present invention may be formed in a disk shape because it uses rotation-based mechanical rotational force, but in another embodiment, the shape is not limited and may be freely selected and used, such as a multi-layered cylinder or a spiral cylinder design that can convert up and down motion into a rotational shape.

Since the rotational triboelectric nanogenerator for a neuro-stimulator of the present invention having the above configuration does not require complicated circuits and batteries, the rotational triboelectric nanogenerator for a neuro-stimulator can have a relatively small volume, be manufactured at low cost, and have simple structure and a simple operation method, and since the rotational triboelectric nanogenerator for a neuro-stimulator is in the form of a neuro-stimulator inserted into the body, there is no need for additional surgery due to battery replacement, so the psychological, economic and physical burden of a patient are reduced.

In addition, triboelectricity is generated based on a rotational structure, but various stimulation parameters can change by adjusting a rotational speed, a distance from an axis, the number of patternings, etc., and the amount of charge can be adjusted to achieve various efficacy and functions.

Hereinabove, although the present invention has been described by specific matters such as detailed components, exemplary embodiments, and the accompanying drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all of modifications equal or equivalent to the claims are intended to fall within the scope and spirit of the present invention.

What is claimed is:

1. A rotational triboelectric nanogenerator for a neuro-stimulator, comprising:
   a disk-shaped electrode unit;
   a first charging body stacked on an upper surface of the electrode unit; and
   a second charging body having a charge opposite to that of the first charging body and disposed on an upper surface of the first charging body,
   wherein the first charging body is provided to serve as a substrate,
   wherein the second charging body includes a plurality of fan shape pieces, each of the plurality of the fan shape pieces being spaced apart from each other at a predetermined interval,
   wherein the second charging body is disposed concentrically with the electrode unit and the first charging body, and is configured to be rotatable with respect to at least one or more of the electrode unit and the first charging body, and
   wherein the second charging body is configured to rotate independently from the electrode unit.

2. The rotational triboelectric nanogenerator for a neuro-stimulator of claim 1, wherein the second charging body is formed to have a smaller area than the first charging body to form a predetermined pattern.

3. The rotational triboelectric nanogenerator for a neuro-stimulator of claim 2, wherein the second charging body is formed so that an edge portion is formed to be in contact with the first charging body with a widest area and contact with a gradually narrower area toward the center.

4. The rotational triboelectric nanogenerator for a neuro-stimulator of claim 1, wherein the electrode unit includes at least a first electrode and a second electrode, and
   the electrode unit is divided into a plurality of compartments, and different electrodes are alternately disposed adjacent to each other at predetermined intervals in a region formed by the compartments.

5. The rotational triboelectric nanogenerator for a neuro-stimulator of claim 4, wherein the second charging body is formed in a predetermined pattern corresponding to an arrangement of the first electrode or an arrangement of the second electrode.

6. The rotational triboelectric nanogenerator for a neuro-stimulator of claim 5, wherein the rotational triboelectric nanogenerator for a neuro-stimulator adjusts a stimulation signal by adjusting the number of patterns of the first electrode and the second electrode in the electrode unit.

7. The rotational triboelectric nanogenerator for a neuro-stimulator of claim 1, wherein the rotational triboelectric nanogenerator for a neuro-stimulator adjusts a stimulation signal by adjusting a rotational speed of the second charging body.

8. The rotational triboelectric nanogenerator for a neuro-stimulator of claim 1, wherein the rotational triboelectric nanogenerator for a neuro-stimulator adjusts a stimulation signal by adjusting a distance between the second charging body and the first charging body.

9. The rotational triboelectric nanogenerator for a neuro-stimulator of claim 1, wherein the first charging body further includes an auxiliary first charging body formed in a predetermined area on the first charging body, and
   the first charging body and the auxiliary first charging body are made of different materials.

10. The rotational triboelectric nanogenerator for a neuro-stimulator of claim 9, wherein the first charging body and the auxiliary first charging body are composed of at least one each and are alternately disposed to each other, and
    the area of the first charging body and the area of the auxiliary first charging body are formed to be different from each other.

* * * * *